US007974916B1

(12) United States Patent
Zucker

(10) Patent No.: US 7,974,916 B1
(45) Date of Patent: Jul. 5, 2011

(54) METHOD AND SYSTEM FOR EXCHANGING INTERESTS IN REAL ESTATE

(75) Inventor: Evan H. Zucker, Denver, CO (US)

(73) Assignee: Dividend Capital Exchange Facilitators, LLC, Denver, CO (US)

( * ) Notice: Subject to any disclaimer, the term of this patent is extended or adjusted under 35 U.S.C. 154(b) by 1995 days.

(21) Appl. No.: 10/798,212

(22) Filed: Mar. 10, 2004

Related U.S. Application Data

(60) Provisional application No. 60/453,345, filed on Mar. 10, 2003.

(51) Int. Cl.
*G06Q 40/00* (2006.01)
(52) U.S. Cl. .......................... 705/38; 705/36 T; 705/35
(58) Field of Classification Search ............... 705/36 T, 705/35; 35/36 T
See application file for complete search history.

(56) References Cited

U.S. PATENT DOCUMENTS

| | | | | |
|---|---|---|---|---|
| 5,680,305 A | * | 10/1997 | Apgar, IV | 705/10 |
| 2002/0013750 A1 | * | 1/2002 | Roberts et al. | 705/35 |

OTHER PUBLICATIONS

Internal Revenue Code Sections 721 and 1031.*
"Vesting and Finance Issues Related to Tax-Deferred Exchanges Under IRC § 1031" by Todd R. Pajonas.*
http://areit.listedcompany.com/news.html/id/99748 A-REIT and OSIM International to Enter Into a $35 Million Sale & Lease-Back Transaction May 5, 2003.*
"Vesting and Finance Issues Related to Tax-Deferred Exchanges Under IRC 1031" by Todd R. Pajonas Summer 2000.*

* cited by examiner

*Primary Examiner* — James A Kramer
*Assistant Examiner* — James A Vezeris
(74) *Attorney, Agent, or Firm* — Baker & Hostetler LLP

(57) ABSTRACT

Methods and systems are provided for performing a tax-deferred transaction involving an Investor owning a Relinquished Property according to structures depending on the form of ownership. One structure can involve an Individual Investor, and another structure can involve an Investor Partnership. The structure involving the Individual Investor as the owner of Relinquished Property can include the steps of: (1) the Investor selling the Relinquished Property; (2) the Investor acquiring as a Replacement Property, directly or indirectly from a REIT or its affiliate for example, an interest in Like Kind Property; and (3) the Investor transferring such interest to the Operating Partnership of the REIT in exchange for DCX Units.

17 Claims, 7 Drawing Sheets

METHOD AND SYSTEM FOR EXCHANGING INTERESTS IN REAL ESTATE

CROSS-REFERENCE TO RELATED APPLICATION

This application claims the benefit of the filing date of U.S. Provisional Patent Application Ser. No. 60/453,345 entitled "Method and System for Exchanging Interests in Real Estate," which was filed on Mar. 10, 2003.

FIELD OF THE INVENTION

The present invention relates generally to methods and systems for performing tax-deferred real estate transactions and, more particularly, to methods and systems for performing tax-deferred exchanges of investment real estate under 26 U.S.C. Section 1031 and Section 721. The present invention also relates generally to methods and systems for efficiently raising capital by Real Estate Investment Trusts.

BACKGROUND OF THE INVENTION

As the population of America ages, and as investors increasingly recognize the volatility and risk inherent in financial markets generally, the investment objectives and concerns of Americans are changing. For example, many investors generally desire diversified investments that provide a safe, steady income stream. Such investors also generally desire liquidity, so that their investment interests can easily be sold or rearranged. Additionally, many investors generally do not want to actively manage their investments.

Mature investors also may have numerous concerns related to inheritance. For example, many mature investors would like their investments to be divisible, so that they may be easily divided among heirs. Additionally, these investors may want their estates to be able to sell part of their investment holdings to pay estate taxes or for other uses.

Investment real estate has difficulties meeting many of these desires. Generally, small to mid-sized real estate holdings require active management to generate a steady current income and favorable long-term returns. Additionally, most real estate investors do not possess enough capital to acquire a sufficient number of properties to effectively diversify. Furthermore, if an investor divides the title to a small real estate holding such as a store or a single building for the benefit of his or her heirs, the collective pieces generally have less value than the whole and may be difficult, expensive and time-consuming to sell. Many of the foregoing concerns affect investors of all age groups.

Despite the foregoing difficulties, however, a large amount of money is currently invested in real estate that is either held for investment or used in a trade or business ("Like Kind Property"). This is because Like Kind Property can provide a wide range of benefits, including a favorable current income stream, the opportunity for capital preservation and appreciation, a hedge against inflation, possible tax benefits and a low correlation with other common investment vehicles such as stocks, bonds and mutual funds.

A sizable fraction of Like Kind Property holdings are owned by small to mid-sized real estate investors (e.g., those having holdings between $250,000 and $20 million). These small to mid-sized real estate owners may decide to sell their Like Kind Property for any number of reasons, including the desire to rebalance their investment portfolios, reduce day-to-day management burdens, diversify their investments, and create tax and estate planning mechanisms. In such situations, real estate owners may wish to sell their Like Kind Property and put the resulting proceeds into investments which can provide the kind of diversification, liquidity, divisibility, relative safety and steady income that many investors desire. Unfortunately, the sale of Like Kind Property may result in severe tax consequences for the investor, particularly when the investor is selling a highly appreciated property and/or a property with a very low tax basis.

Title 26, Section 1031 of the Internal Revenue Code (hereinafter "IRC Section 1031") permits deferral of the taxes that would be due upon the sale of Like Kind Property by reinvesting the resulting proceeds into other Like Kind Property, subject to several conditions ("1031 Exchange"). The text of the IRC Section 1031 is reproduced herein:

Section 1031

Statute (a) Nonrecognition of Gain or Loss from Exchanges Solely in Kind (1) In general No gain or loss shall be recognized on the exchange of property held for productive use in a trade or business or for investment if such property is exchanged solely for property of like kind which is to be held either for productive use in a trade or business or for investment.

(2) Exception

This subsection shall not apply to any exchange of—

(A) stock in trade or other property held primarily for sale, (B) stocks, bonds, or notes, (C) other securities or evidences of indebtedness or interest, (D) interests in a partnership, (E) certificates of trust or beneficial interests, or (F) choses in action. For purposes of this section, an interest in a partnership which has in effect a valid election under section 761(a) to be excluded from the application of all of subchapter K shall be treated as an interest in each of the assets of such partnership and not as an interest in a partnership.

(3) Requirement that property be identified and that exchange be completed not more than 180 days after transfer of exchanged property For purposes of this subsection, any property received by the taxpayer shall be treated as property which is not like-kind property if—

(A) such property is not identified as property to be received in the exchange on or before the day which is 45 days after the date on which the taxpayer transfers the property relinquished in the exchange, or (B) such property is received after the earlier of—

(i) the day which is 180 days after the date on which the taxpayer transfers the property relinquished in the exchange, or (ii) the due date (determined with regard to extension) for the transferor's return of the tax imposed by this chapter for the taxable year in which the transfer of the relinquished property occurs.

(b) Gain from Exchanges not Solely in Kind

If an exchange would be within the provisions of subsection (a), of section 1035(a), of section 1036(a), or of section 1037(a), if it were not for the fact that the property received in exchange consists not only of property permitted by such provisions to be received without the recognition of gain, but also of other property or money, then the gain, if any, to the recipient shall be recognized, but in an amount not in excess of the sum of such money and the fair market value of such other property.

(c) Loss from Exchanges not Solely in Kind

If an exchange would be within the provisions of subsection (a), of section 1035(a), of section 1036(a), or of section 1037(a), if it were not for the fact that the property received in exchange consists not only of property permitted by such provisions to be received without the recognition of gain or loss but also of other property or money, then no loss from the exchange shall be recognized.

(d) Basis

If property was acquired on an exchange described in this section, section 1035(a), section 1036(a), or section 1037(a), then the basis shall be the same as that of the property exchanged, decreased in the amount of any money received by the taxpayer and increased in the amount of gain or decreased in the amount of loss to the taxpayer that was recognized on such exchange. If the property so acquired consisted in part of the type of property permitted by this section, section 1035(a), section 1036(a), or section 1037(a), to be received without the recognition of gain or loss, and in part of other property, the basis provided in this subsection shall be allocated between the properties (other than money) received, and for the purpose of the allocation there shall be assigned to such other property an amount equivalent to its fair market value at the date of the exchange. For purposes of this section, section 1035(a), and section 1036(a), where as part of the consideration to the taxpayer another party to the exchange assumed (as determined under section 357(d)) a liability of the taxpayer, such assumption shall be considered as money received by the taxpayer on the exchange.

(e) Exchanges of Livestock of Different Sexes

For purposes of this section, livestock of different sexes are not property of a like kind.

(f) Special Rules for Exchanges Between Related Persons (1) In general

If—

(A) a taxpayer exchanges property with a related person, (B) there is nonrecognition of gain or loss to the taxpayer under this section with respect to the exchange of such property (determined without regard to this subsection), and (C) before the date 2 years after the date of the last transfer which was part of such exchange—

(i) the related person disposes of such property, or (ii) the taxpayer disposes of the property received in the exchange from the related person which was of like kind to the property transferred by the taxpayer, there shall be no nonrecognition of gain or loss under this section to the taxpayer with respect to such exchange; except that any gain or loss recognized by the taxpayer by reason of this subsection shall be taken into account as of the date on which the disposition referred to in subparagraph (C) occurs.

(2) Certain dispositions not taken into account

For purposes of paragraph (1)(C), there shall not be taken into account any disposition—

(A) after the earlier of the death of the taxpayer or the death of the related person, (B) in a compulsory or involuntary conversion (within the meaning of section 1033) if the exchange occurred before the threat or imminence of such conversion, or (C) with respect to which it is established to the satisfaction of the Secretary that neither the exchange nor such disposition had as one of its principal purposes the avoidance of Federal income tax.

(3) Related person

For purposes of this subsection, the term "related person" means any person bearing a relationship to the taxpayer described in section 267(b) or 707(b)(1).

(4) Treatment of certain transactions

This section shall not apply to any exchange which is part of a transaction (or series of transactions) structured to avoid the purposes of this subsection.

(g) Special Rule where Substantial Diminution of Risk (1) In general

If paragraph (2) applies to any property for any period, the running of the period set forth in subsection (f)(1)(C) with respect to such property shall be suspended during such period.

(2) Property to which subsection applies

This paragraph shall apply to any property for any period during which the holder's risk of loss with respect to the property is substantially diminished by—

(A) the holding of a put with respect to such property, (B) the holding by another person of a right to acquire such property, or (C) a short sale or any other transaction.

(h) Special Rules for Foreign Real and Personal Property

For purposes of this section—

(1) Real property

Real property located in the United States and real property located outside the United States are not property of a like kind.

(2) Personal property (A) In general

Personal property used predominantly within the United States and personal property used predominantly outside the United States are not property of a like kind.

(B) Predominant use

Except as provided in subparagraph 1 (C) and (D), the predominant use of any property shall be determined based on—

(i) in the case of the property relinquished in the exchange, the 2-year period ending on the date of such relinquishment, and (ii) in the case of the property acquired in the exchange, the 2-year period beginning on the date of such acquisition.

(C) Property held for less than 2 years

Except in the case of an exchange which is part of a transaction (or series of transactions) structured to avoid the purposes of this subsection—

(i) only the periods the property was held by the person relinquishing the property (or any related person) shall be taken into account under subparagraph (B)(i), and (ii) only the periods the property was held by the person acquiring the property (or any related person) shall be taken into account under subparagraph (B)(ii).

(D) Special rule for certain property

Property described in any subparagraph of section 168 (g)(4) shall be treated as used predominantly in the United States.

Footnotes

1. So in original. Probably should be "subparagraphs".

(end of Section 1031)

Thus, for example, the owner of a small store could use a 1031 Exchange to defer taxes when he or she sells the store and reinvests the proceeds in, for example, an apartment building. To receive all of the benefits from an IRC Section 1031 Exchange, (i) the purchase price of the new property ("Replacement Property") must be equal to or greater than the selling price of property sold ("Relinquished Property"), and (ii) to the extent the Relinquished Property was encumbered by debt, the investor must either utilize an equal or greater amount of debt to purchase the Replacement Property or contribute additional cash equal to or greater than such debt amount for the acquisition of the Replacement Property.

Thus, if the Relinquished Property was sold for $1,000,000, a Replacement Property must be purchased for at least $1,000,000. If the purchase price of the Replacement Property is less than the selling price of the Relinquished Property, taxes are payable on the difference, known as "boot". On that same note, if the Relinquished Property was subject to $500,000 of debt at the time of its sale, a Replacement Property must be purchased using either $500,000 of debt or $500,000 of incremental cash contributed by the investor. If the combination of the debt amount and the additional cash contributed by the investor to acquire the Replacement Property is less than the debt of the Relinquished Property at the time of its sale, taxes are payable on the difference, known as "mortgage boot".

IRC Section 1031 also imposes certain strict time limits for completion of a 1031 Exchange transaction. Once the Relinquished Property has changed ownership, the owner of the exchanged property (the "Exchanger") has up to 45 days to identify Replacement Property, generally, for example, choosing either the three-property or the 200% rule, and a total of 180 days to close on the one or more of the identified Replacement Properties. If these strict time limits are not met, the transaction is not deemed to be a 1031 Exchange, and gains from the sale of the Relinquished Property are subject to taxation, which could be extremely costly to the Exchanger. Additionally, the Exchanger cannot exercise control, either direct or indirect, over the net proceeds resulting from the sale of the Relinquished Property. For this reason, the mechanics of an IRC Section 1031 Exchange generally are handled by a third party, a so-called "Qualified Intermediary," who sells the Relinquished Property on behalf of the exchanger, holds the net proceeds resulting from such sale, acquires the Replacement Property that has been identified by the Exchanger within the allotted time frames, and subsequently transfers title to the Replacement Property to the Exchanger.

IRC Section 1031 Exchanges help mitigate the severe tax consequences of selling Like Kind Property by permitting a tax-deferred exchange of one piece of Like Kind Property for another. However, Section 1031 Exchanges alone may not provide investors with all of the benefits they desire. For most owners of investment real estate, particularly the majority of such owners who are not hands-on, active, professional real estate investors, it is difficult to identify, within the required 45 day period described above, one or more acceptable Replacement Properties satisfying the following generally desirable characteristics, among others: a) availability for purchase, b) reasonably priced, c) situated in a location convenient or desirable to the investor, d) sized appropriately so as to eliminate a "boot" problem, e) able to be leveraged so as to eliminate a "mortgage boot" problem, f) requiring less active management, g) featuring investment transparency such that the investor is aware of any faults early on in the 45-day identification period, and h) producing a current income stream and possessing other desirable investment parameters such as potential future liquidity, divisibility, and others discussed below. Also, because an IRC Section 1031 Exchange typically results in the ownership of a single Like Kind Property, other concerns of investors, such as diversification and divisibility are not addressed by IRC Section 1031 Exchanges. Furthermore, many attempted IRC Section 1031 Exchanges fail, with devastating tax consequences, due to difficulties in identifying and closing on suitable Replacement Properties within the strict time limits imposed by the statute. To frame the size of this problem, according to the Wall Street Journal, over $50 billion worth of 1031 Exchanges were completed in 1999 alone; therefore, a mere 10% increase in the success rate of completing 1031 Exchanges that year would have equated to more than $5 billion in additional 1031 Exchanges.

Some of the problems outlined above with respect to IRC Section 1031 Exchanges may be mitigated through the use of tenancy-in-common interests as Replacement Properties. Tenancy-in-common interests, which are simply undivided fractional co-ownership interests in Like Kind Property, are sold by a number of sponsors as Replacement Properties for investors seeking to complete IRC Section 1031 Exchanges. Some of the benefits of certain tenancy-in-common interests include a) their availability for purchase, b) the fact that they can often be sized appropriately so as to eliminate a "boot" problem, c) their need for less active management, and d) their ability in many cases to provide investors with a current income stream. Individual tenancy-in-common interests, however, also have their drawbacks, including some or all of the following: a) a lack of diversification to mitigate property, location, industry and tenant risks, b) a lack of liquidity, c) potential value dilution upon sale of the interest, d) undesirable governance provisions, d) a lack of divisibility, e) a lack of available non-recourse financing, f) a lack of flexibility in financing tailored to the specific needs of each exchanger, g) a lack of availability of attractive alternative properties due to supply/demand and timing constraints, h) very high upfront transaction costs resulting from market inefficiencies, i) unlimited liability of individual tenancy in common owners due to their classification under the law as not being limited partners or shareholders but rather as being co-venturers or general partners, and j) lack of full ongoing reporting transparency.

For example, it is difficult for an investor to diversify by obtaining tenancy-in-common interests in a number of different properties because (i) demand for such interests currently exceeds supply of attractive alternative properties, and (ii) sellers of tenancy-in-common interests have minimum investment thresholds per property, limiting the number of properties in which an investor can acquire interests given his or her available proceeds. Additionally, the full value of tenancy-in-common interests is often not realized unless the entire property, not just the tenancy-in-common interest, is sold. For this to happen in most cases, however, 100% of the tenancy-in-common owners of a particular property (which may number as high as 35) must unanimously agree to sell the property. While tenancy-in-common interests can be sold by themselves, this may be difficult to do and could result in the interests being sold for less than their underlying value, as up-front transaction costs and fees are typically very high and no secondary market has yet developed for such interests. Furthermore, many tenancy-in-common interest providers require investors to take on a high degree of leverage with respect to their interests (often more than such investors require to avoid mortgage boot), thus increasing the level of risk borne by such investors. Such providers also may require all investors to take the same blanket lien, thus hurting those investors desiring limited leverage. And finally, because of the current high level of demand for tenancy-in-common interests, providers of such interests are charging large up-front fees, sometimes approximating 25% of an investor's initial equity investment. Other further drawbacks to tenancies in common are discussed above, and include, for example, lack of divisibility and unlimited liability of individual tenancy owners.

One prior art approach for facilitating an IRC Section 1031 transaction is described in U.S. Pat. No. 6,292,788 B1 issued to Roberts et al. In Roberts, real property that may consist of a number of commercial real estate parcels and having a preselected total value is purchased and aggregated. The aggregated properties are then made the subject of at least one master agreement, and title to the property is then divided into tenant-in-common deeds, or deedshares, having pre-determined denominations. The deedshares are then used as Replacement Property under IRC Section 1031.

Although the creation of deedshares according to Roberts results in the formation of Replacement Property under IRC Section 1031, a Roberts transaction can have several disadvantages. For example, the master agreement must include restrictive provisions such that the tenancy-in-common is not viewed as a partnership under the tax laws, in order to maintain eligibility of the deedshares as Replacement Property under IRC Section 1031. As such, the terms of the master agreement typically prevent holders of deedshares from providing common services or entering into joint venture activities with respect to the aggregated properties.

Another drawback to a Roberts transaction is that because it is cumbersome to add/remove various properties to/from the properties under the master agreement, it is difficult to provide the deedshare holder with an interest in a diversified real estate portfolio over time. Further, although a Roberts transaction does provide limited additional diversification over single property alternatives, such level of diversification is far less than the degree of diversification that can be achieved via an Umbrella Partnership Real Estate Investment Trust. Additional exemplary drawbacks of the approach of Roberts are that deedshares are illiquid instruments which may experience value dilution upon sale, deedshare holders have unlimited liability with respect to claims against the tenancy-in-common, and deedshare holders are subject to the various undesirable governance provisions contained within most tenancy-in-common programs (as discussed above).

Numerous attempts have been made to provide small to mid-sized real estate investors with Like Kind Property that is diversified, liquid, enjoys favorable current income characteristics, requires minimal day-to-day management, features full reporting and information transparency, is readily divisible, shields investors from unlimited liability, and is not tied to unfavorable governance provisions. One way such investors can realize all of these benefits is by investing in a Real Estate Investment Trust, or REIT. A REIT is a company that typically operates a large pool of diversified, professionally managed, institutional quality real estate on behalf of its investors. Many REITs are publicly traded or, alternatively, publicly offer their securities, and are fully public reporting companies pursuant to SEC and/or Blue Sky regulations. Shares in a REIT may therefore be purchased, or (for REITs utilizing certain structures) acquired indirectly in exchange for real property, as described below. Because these shares are often publicly traded on major exchanges or come with full public reporting as described above, they have characteristics similar to the characteristics of shares in other "public" companies. For example, the shares are typically easy to liquidate, readily divisible, and often provide a reasonably favorable current income through regular dividend payments.

There are effectively two methods an owner of investment real estate can utilize to convert his or her investment into the equivalent of shares in a REIT. The first method is for the investor to simply sell his or her Like Kind Property and reinvest the proceeds in REIT shares. However, because REIT shares are not defined as Like Kind Property pursuant to IRC Section 1031 and an investor cannot therefore acquire REIT shares as Replacement Property under an IRC 1031 Exchange, this method may result in severe tax consequences for the investor, particularly if the investor is selling highly appreciated property and/or a property with a very low tax basis. The second method is for the investor to utilize a tax deferred exchange under Title 26, Section 721 of the Internal Revenue Code (hereinafter "IRC Section 721") by contributing his or her Like Kind Property into a partnership in exchange for interests in the receiving partnership, typically using what is known as an Operating Partnership within an Umbrella Partnership Real Estate Investment Trust, or UPREIT, structure. The text of the IRC Section 721 is reproduced herein:

Section 721

Statute (a) General Rule

No gain or loss shall be recognized to a partnership or to any of its partners in the case of a contribution of property to the partnership in exchange for an interest in the partnership.

(b) Special Rule

Subsection (a) shall not apply to gain realized on a transfer of property to a partnership which would be treated as an investment company (within the meaning of section 351) if the partnership were incorporated.

(c) Regulations Relating to Certain Transfers to Partnerships

The Secretary may provide by regulations that subsection (a) shall not apply to gain realized on the transfer of property to a partnership if such gain, when recognized, will be includible in the gross income of a person other than a United States person.

(d) Transfers of Intangibles

For regulatory authority to treat intangibles transferred to a partnership as sold, see section 367(d)(3).

(end of Section 721)

Pursuant to IRC Section 721, an investor can contribute property to a partnership on a tax-deferred basis in exchange for interests in the partnership. To utilize this provision of the tax code, many REITs have implemented the UPREIT structure. Under this structure, a REIT forms an affiliated Operating Partnership which serves as the entity that acquires and owns all of the REIT's real property, and the REIT acts as the general partner and typically the majority owner of the Operating Partnership, overseeing the Operating Partnership's activities. Interests in the Operating Partnership ("OP Units") are the substantial economic equivalent of REIT shares, and the holders of OP Units are not liable for any debts, liabilities, contracts or obligations of the Operating Partnership in excess of their capital contributions to the Operating Partnership. In addition, holders of OP Units are typically allowed to exchange such units into shares of the affiliated REIT in full or in part at any time or from time to time. Further, holders of OP Units typically receive dividend distributions in the same amount and at the same time as dividends are paid to the REIT's shareholders. Therefore, OP Units, like REIT shares, typically represent a small piece of a large, diversified, professionally managed portfolio of institutional quality real property. While shareholders typically acquire their REIT shares for cash, and while the REIT typically acquires OP Units from its affiliated Operating Partnership using cash raised from such sale of its REIT shares, owners of investment real estate can acquire OP Units on a tax deferred basis by contributing their investment real estate to the Operating Partnership in exchange for OP Units pursuant to IRC Section 721.

The benefits to an investor of exchanging his or her investment real estate for OP Units are considerable. First, OP Units typically provide the investor with favorable current income in the form of regular dividend distributions that are derived from a diversified portfolio of real estate. Second, because the REIT handles the professional management of the portfolio of properties, the investor is freed from the burden of managing real estate investments. Third, as mentioned above, OP Units can be easily converted into REIT shares if the investor wishes to liquidate his or her investment. Fourth, the investor typically receives full reporting and information transparency as the REIT is typically a fully public reporting company. Fifth, as a limited partner, the investor is typically shielded from liability related to the operations of, and debt encumbering, the Operating Partnership's assets. Sixth, as mentioned above, the investor benefits from the diversification inherent in the REIT's portfolio, thus reducing property, location, tenant and industry risks. Also, OP Units are completely divisible, making them very effective tax and estate planning tools.

By way of background, in exchange for following a number of rules relating to the type of assets they can own, the type of income they can earn, and the amount of their income they are required to distribute to investors, REITs (unlike other corporations) pay no tax at the corporate level, effectively allowing them to pass along this substantial tax benefit and extra cash flow to their shareholders and OP Unit holders. One of these rules provides that REITs must distribute annually to their shareholders an amount equal to 90% of their pre-tax income. This effectively means that REITs typically pay high dividends relative to other corporations, which do not enjoy the REIT tax exemption at the corporate level, and which are not required to make any annual distributions. On the other hand, the 90% distribution requirement means that REITs cannot typically grow as a result of retaining their earnings as most of those earnings are currently required to be distributed annually. As a result, in order to grow, most REITs need to access the equity and debt markets on a regular basis to obtain new capital. As such, tax deferred contributions of investment real estate to an UPREIT in exchange for OP Units pursuant to IRC Section 721 provides a whole host of benefits to the REIT. First, because the REIT is acquiring properties directly for OP Units, the REIT is freed from the obligation, expense, and risk of first raising cash to acquire properties through the sale of REIT shares, and also from maintaining potentially dilutive sufficient cash reserves which might be necessary for taking advantage of future investment opportunities. Second, because investors can contribute their property to the UPREIT on a tax deferred basis, the REIT is able to acquire properties from investors that might not otherwise sell due to the potentially severe tax consequences of doing so, and may be able to acquire such properties at a more favorable price because investors are relieved of the obligation to pay tax on the sale of their property. As a result of the reasons mentioned above, UPREIT transactions typically provide REITs access to much needed capital on an efficient basis. Finally, the very act of seeking out investors looking to do tax deferred real estate exchanges puts REITs in touch with investors who may be interested in acquiring those properties the REIT wishes to permanently divest, as such properties could serve as the investors' Replacement Properties pursuant to their IRC Section 1031 Exchanges.

From the typical investor's perspective, however, there is one major drawback to the UPREIT structure: because the UPREIT will ultimately own the property it receives in exchange for the OP Units it provides to the investor, it must determine that the investor's property constitutes a desirable addition to its portfolio. Because the vast majority of the real estate owned by investors, and in particular small to mid-size investors, does not fit this description, most small to mid-size investors are unable to enjoy the substantial benefits afforded by the UPREIT structure.

In view of the foregoing, it would be desirable to provide to investors methods of investing in real estate that provide a degree of safety through diversification, a steady income stream, divisibility, ready liquidity, investment transparency, relatively low risk return, and limited involvement in management of property.

It would also be desirable to provide to investors methods and systems for exchanging investment real estate they currently own for investment real estate that possesses some or all of the characteristics outlined in the above paragraph, with the exchange being tax deferrable in accordance with IRC Section 1031 and/or IRC Section 721.

It would further be desirable to provide investors methods and systems for acquiring Replacement Properties in accordance with IRC Section 1031 that possess the characteristics outlined above, are readily available, are reasonably priced, can be easily identified within the 45 day time requirement, can be easily acquired within the 180 day time requirement, are sized appropriately so as to eliminate a "boot" problem, and are able to be leveraged, preferably on a non-recourse basis so as to eliminate a "mortgage boot" problem.

It still further would be desirable to provide REITs with the ability to efficiently raise capital and/or acquire properties from the very large number of small to mid-size owners of investment properties, regardless of what properties such investors currently own in terms of desirability to REITs.

SUMMARY OF THE INVENTION

Accordingly, the present invention provides methods and systems for investing in real estate that provide, among other benefits, a degree of safety through diversification, a steady income stream, divisibility, ready liquidity, investment transparency, relatively low risk return, and limited involvement in management of property.

This invention also provides methods and systems for exchanging currently owned Like Kind Property for Like Kind Property that possesses all of the characteristics outlined in the above paragraph, with such exchange being tax deferrable in accordance with IRC Section 1031 and/or IRC Section 721.

The present invention further provides methods and systems for acquiring Replacement Properties in accordance with IRC Section 1031 that possess the characteristics outlined above, are readily available, are reasonably priced, can be easily identified within the 45 day time requirement, can be easily acquired within the 180 day time requirement, are sized appropriately so as to eliminate a "boot" problem, and are able to be leveraged as to eliminate a "mortgage boot" problem.

This invention still further provides REITs with the ability to raise capital and/or acquire properties from small to mid-size owners of investment properties, regardless of the fact that the vast majority of such investors own properties that most REITs would typically not find desirable. This will provide REITs with access to a vast and previously untapped pool of efficient capital.

Even further, the present invention allows broker-dealers to access a previously unobtainable sizeable real estate asset base including the assets of numerous high net worth investors, increase the value of their assets under management, provide more comprehensive financial and tax planning services, and increase their range of products and services on which to earn transaction and asset management fees.

Accordingly, the present invention provides unique methods and systems which combine the advantages of IRC Section 1031 with the advantages of IRC Section 721 to provide investors with the opportunity to complete a tax deferred exchange and receive Replacement Property that provides diversification, a steady income stream, divisibility, liquidity, and investment transparency, all while virtually eliminating the investors' ongoing management responsibilities. The present invention facilitates the sale of an investor's currently owned property in exchange for an interest in a large, diversified pool of professionally managed, institutional-quality real estate pursuant to IRC Sections 721 and 1031.

Specifically, the present invention provides a method for performing a tax-deferred transaction involving an Investor owning a Relinquished Property according to structures depending on the form of ownership. One structure can involve an Individual Investor as the owner of the Relinquished Property, and can include the steps of: (1) the Investor selling the Relinquished Property; (2) the Investor acquiring as a Replacement Property, directly or indirectly from a REIT or its affiliate for example, an interest in Like Kind Property; and (3) the Investor transferring such interest to the Operating Partnership of the REIT in exchange for OP Units. Another structure can involve an Investor Partnership as the owner of the Relinquished Property, and can include the steps of: (1) the Investor Partnership selling the Relinquished Property; (2) one or more partners in the Investor Partnership transferring a partial interest in the Investor Partnership to the Operating Partnership of a REIT in exchange for OP Units; (3) the Investor Partnership acquiring as a Replacement Property, directly or indirectly from a REIT or its affiliate for example, an interest in Like Kind Property; and (4) one or more partners in the Investor Partnership transferring all remaining interests in the Investor Partnership to the Operating Partnership of the REIT in exchange for additional OP Units.

Generally, the present invention improves upon any previously known methods by providing an investment vehicle that (1) affords the investor substantial tax-deferral benefits which can be readily realized in accordance with IRC Section 1031 and IRC Section 721, (2) provides the investor with a degree of safety through diversification, a steady income stream, divisibility, ready liquidity, investment transparency, and limited involvement in management of owned property, and (3) allows REITs to tap vast and previously unutilized sources of capital within the real estate industry (e.g., from small to mid-sized real estate exchangers) and formerly inaccessible potential buyers of REIT assets, and (4) allows broker-dealers to access a previously unobtainable sizeable real estate asset base including the assets of numerous high net worth investors, increase the value of their assets under management, provide more comprehensive financial and tax planning services, and increase their range of products and services on which to earn transaction and asset management fees.

Notably, the present invention features a comprehensive distribution network, involving aspects which may include any or all of the following: a managing broker-dealer, a network of participating broker-dealers, and internal and external wholesalers. The benefits of this network include, for example, efficient identification of a broad pool of investors (i.e., Exchangers). Such benefits are combined with the numerous advantages of REITs and IRC Sections 1031 and 721 discussed above.

Some specific improvements provided by the present invention include (i) the ability to provide investors looking to complete 1031 Exchanges with a readily available source of Replacement Properties that meet investors' objectives and are sized, and can be levered appropriately, to comply with the requirements of IRC Section 1031; (ii) an efficient and transparent process and structure which, within the IRC Section 1031 framework of timing rules, generally leaves the timing of exchanges to the investors' discretion; and (iii) the opportunity for small to mid-sized investors to enjoy the benefits of an UPREIT exchange regardless of the type or desirability to REITs of the Relinquished Property they currently own. The invention also features due diligence relating to prospective investment properties, which serves to benefit an Exchanger, and helps to eliminate the risk that an investor may not be able to identify a property that: a) is the correct size, b) is available for sale, c) is appropriate for the Exchanger's investment objectives, d) has leverage available on commercially reasonable terms, and e) is desired by a REIT, thus allowing an Exchanger the opportunity to complete a Section 721 Exchange into a large, diversified pool.

Typically, the Replacement Property will be an institutional quality property, and the REIT, its Operating Partnership or an affiliate thereof may own or control an interest in the Replacement Property or may have the contractual right to acquire it. The investor can exchange his or her Relinquished Property for an interest in the Replacement Property sufficient for the investor to avoid "boot" pursuant to IRC Section 1031. In order to meet particular needs of specific investors, non-recourse mortgages can generally be applied to each interest in the Replacement Property in whatever amount necessary to avoid "mortgage boot" under IRC Section 1031. Investors are not required to take on a higher degree of leverage than is necessary to avoid boot, nor are they subjected to blanket liens.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE FIGURES

For a fuller understanding of the invention, reference is made to the following description taken in conjunction with the accompanying drawings, in which.

DETAILED DESCRIPTION OF THE PREFERRED EMBODIMENTS

Figure 1A:
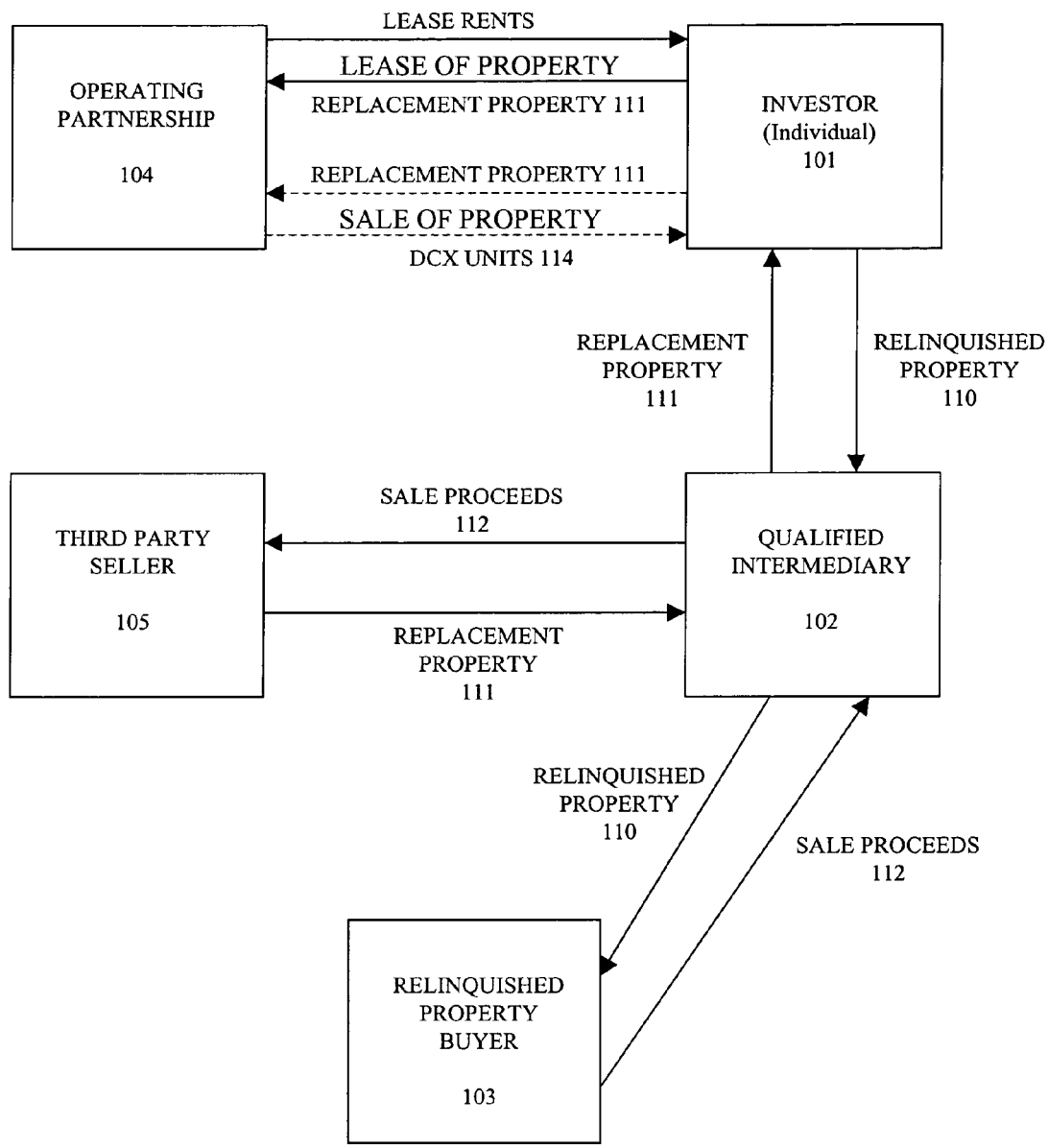
FIG. 1A is a block diagram of a structure for implementing a tax-deferred exchange of real estate in accordance with the present invention.

The present invention provides methods and systems to facilitate investment in real estate which provides a degree of safety through diversification, a steady income stream, divisibility, ready liquidity, investment transparency, and relatively low risk return, without the need for the investor to handle management of the property. The methods and systems provide for substantial tax-deferral benefits to an investor under IRC Section 721 and/or IRC Section 1031, provide for substantial new sources of capital to a real estate investment entity such as a REIT, and provide for access by broker-dealers to a vast new untapped source of new assets to manage. In one embodiment of the invention, the benefits under IRC Section 1031 are realized by the Investor by selling a Relinquished Property to a Qualified Intermediary, and buying one or more Replacement Properties, generally from, by way of non-limiting example, an Operating Partnership of a REIT or its affiliate. The one or more Replacement Properties in turn are leased to the Operating Partnership. The benefits under IRC Section 721 may also be realized by the Investor because the Operating Partnership, under certain circumstances, can purchase the one or more Replacement Properties from the Investor in exchange for OP Units. The Investor thereby can receive a steady income through ownership of the OP Units which can represent a highly diversified portfolio, and can also be readily liquid and divisible, while the Operating Partnership benefits through receipt of an infusion of capital made available through the initial sale of the one or more Replacement Properties to the Investor or through the contribution of a Replacement Property not initially owned by the Operating Partnership.

In another embodiment, an Investor Partnership realizes the benefits of IRC Section 1031 by selling a Relinquished Property and acquiring a Replacement Property according to the process discussed above, while also obtaining the benefits of IRC Section 721 pursuant to a process in which the partners of the Investor Partnership transfer a partial interest in the Investor Partnership to the Operating Partnership in exchange for OP Units, and subsequently transfer all remaining interests in exchange for additional OP Units.

Generally, the present invention can be implemented to accommodate property owned by an individual or by a partnership with slight variations to the concepts employed. Steps associated with each variation will be discussed below.

DEFINITIONS

In order to facilitate the following description of the present invention, the following terms will be used:

"Dividend Exchange Unit" (or "DCX Unit") shall mean an Operating Partnership Unit, as included in some embodiments of the present invention.

"Individual Investor" shall mean an individual, a single member limited liability company, a corporation, or a trust.

"Investor" shall mean either an Individual Investor or an Investor Partnership.

"Investor Partnership" shall mean a pre-existing partnership, or limited liability company that can be classified as a partnership for Federal income tax purposes, for which an asset of partnership or limited liability company can be a property which can be treated as a Relinquished Property.

"Like Kind Property" shall mean real estate that is either held for investment or used in a trade or business.

"Operating Partnership" shall mean a partnership that invests in any REIT qualifying asset, and include any affiliate of such partnership.

"Operating Partnership Unit" shall mean an interest in an Operating Partnership that owns a large diversified portfolio of professionally managed institutional quality real property and real estate related interests.

"Qualified Intermediary" shall mean a person that facilitates the transfer of a Relinquished Property for a Replacement Property pursuant to IRC Section 1031.

"Real Estate Investment Trust" (REIT) shall mean a trust or corporation that qualifies as a REIT for Federal income tax purposes.

"Relinquished Property" shall mean a Like Kind Property that has been held as an investment or for use in a trade or business for at least one year (or other statutory period designated for Federal tax purposes).

"Replacement Property" shall mean a Like Kind Property to be held as an investment or for use in a trade or business, which is acquired to replace a Relinquished Property in a 1031 Exchange. Replacement Property can include all defined real property interests such as tenancies in common, condominiums, and leaseholds.

"Unit Holder" shall mean any legal "person" that holds at least one Operating Partnership Unit.

Overview

Referring now to FIG. 1A, a block diagram illustrating an embodiment of the present invention is shown. Generally, an Investor 101 (in this case, an Individual Investor) enters into a sale agreement for a Relinquished Property 110 with a Relinquished Property Buyer 103. The Investor 101 will also coordinate with a Qualified Intermediary 102 to facilitate consummation of the sale of the Relinquished Property 110 to the Relinquished Property Buyer 103. Sale proceeds 112 from the sale of the Relinquished Property 110 will be deposited into an exchange account held by the Qualified Intermediary 102. The Investor 101 will also enter into an agreement to purchase a Replacement Property 111. The Qualified Intermediary 102 will utilize the sale proceeds 112 to acquire the Replacement Property 111, which is identified and may be underwritten by an Operating Partnership 104, from a Third Party Seller 105 (which in some cases can be Operating Partnership 104), on behalf of the Investor 101, and the Investor 101 will lease the Replacement Property 111 to an Operating Partnership 104. After some period of time (such as, for example, one year), the Operating Partnership 104 may acquire the Replacement Property 111 from the Investor 101 in exchange for ownership interests in the Operating Partnership 104 (such as DCX Units 114). Alternatively, the Investor 101 may continue to lease the Replacement Property 111 to the Operating Partnership 104, or, under certain circumstances, terminate the lease and otherwise retain ownership and manage the property.

Figure 1B:
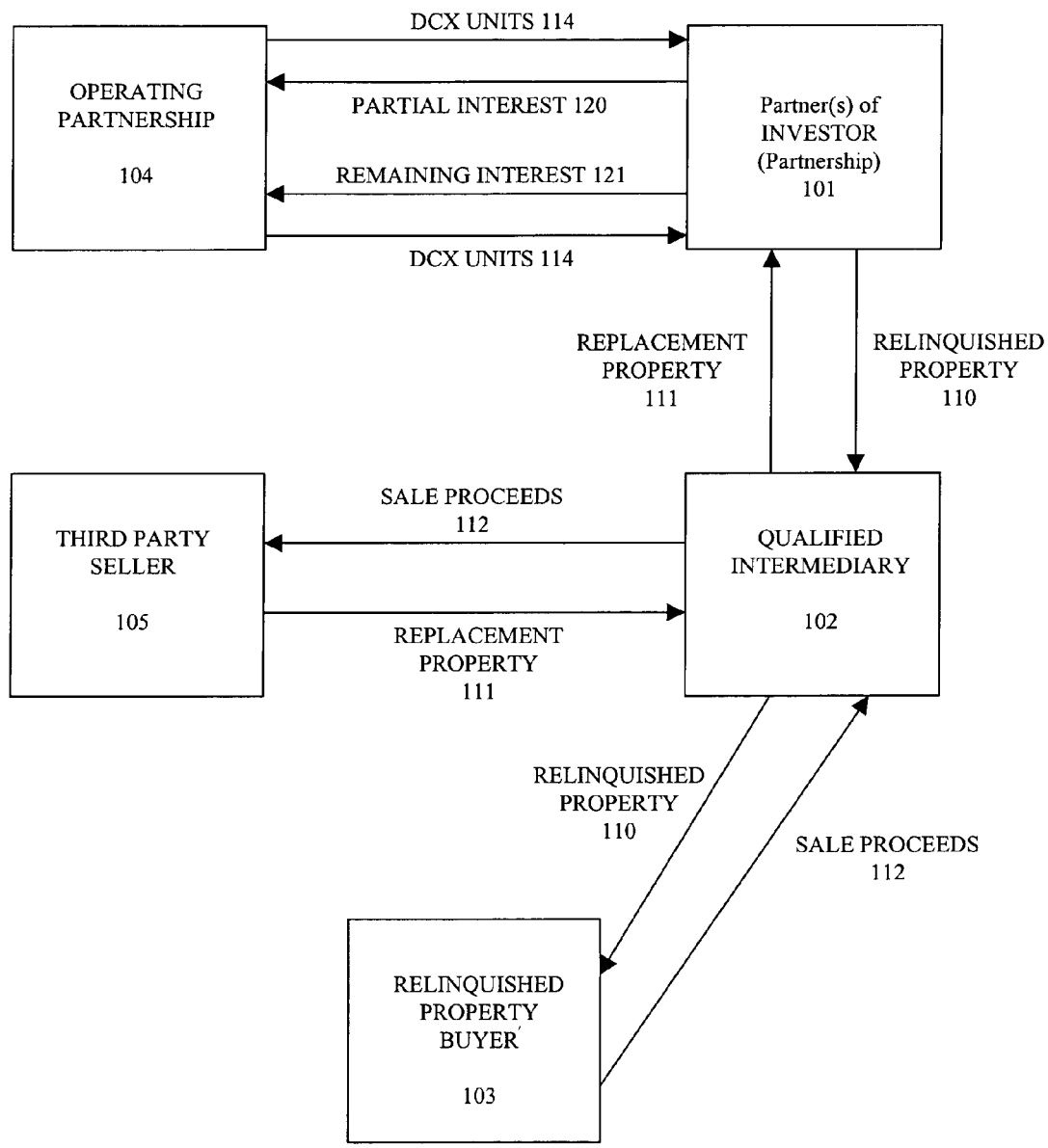
FIG. 1B is a block diagram of a structure for implementing a tax-deferred exchange of real estate in accordance with the present invention.

In another embodiment, as shown in FIG. 1B, Investor 101 (now an Investor Partnership) sells Relinquished Property 110 as described above with respect to FIG. 1A. After some period of time, (such as, for example, 12 months plus one day) the partners of Investor 101 then transfer a Partial Interest 120 in Investor 101 to Operating Partnership 104 in exchange for DCX Units 114. Next, the Investor 101 purchases Replacement Property 111 as described above with respect to FIG. 1A. The partners of Investor 101 then transfer all Remaining Interests 121 in Investor 101 to Operating Partnership 104 in exchange for additional DCX Units 114. One advantage to the partners of the Investor Partnership embodied in the present invention is that one or more partners can have the individual freedom to either (a) exchange their interests in the Investor 101 for DCX Units 114 or (b) upon sale of the Relinquished Property 110, take a share of the resulting net proceeds in cash, and not participate in the exchange.

Figure 2:
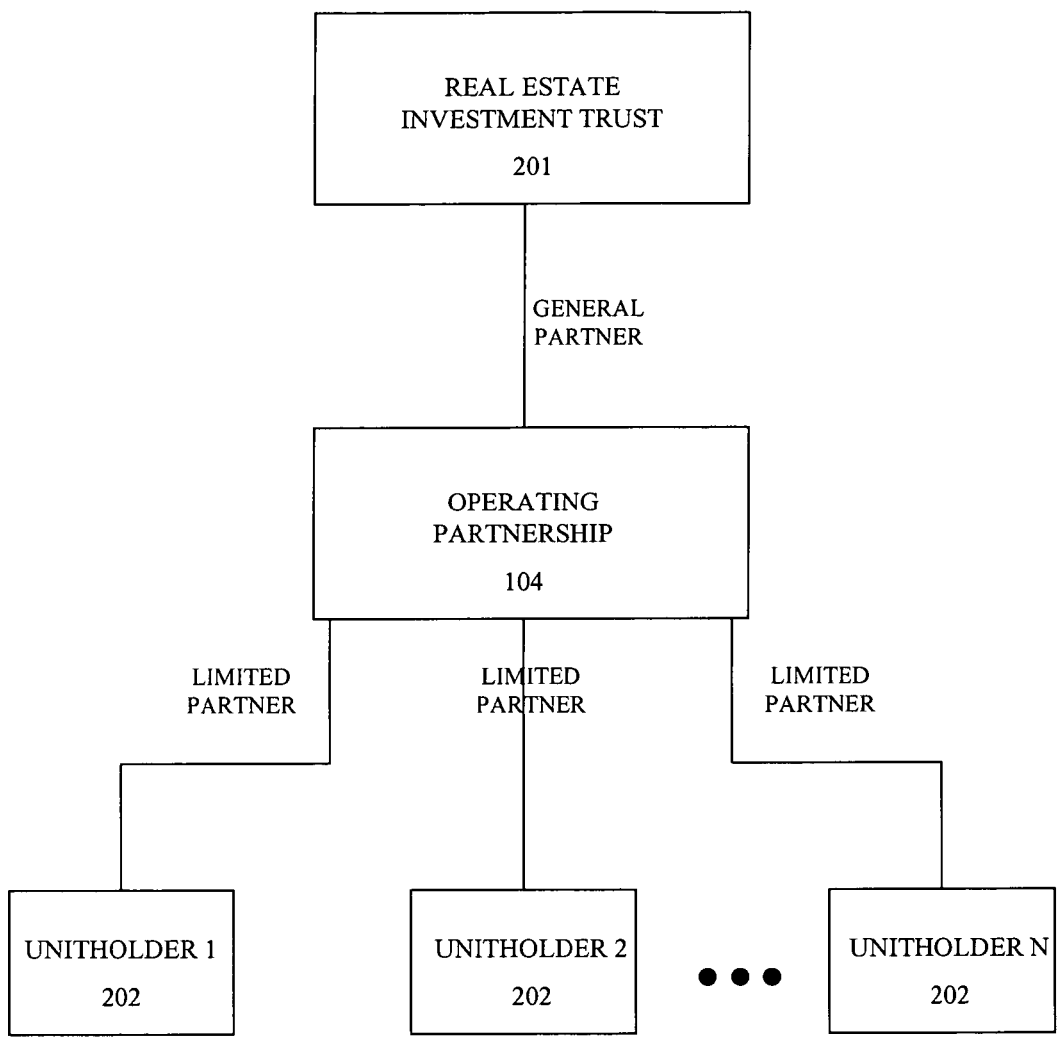
FIG. 2 is a block diagram of an UPREIT structure.

Referring now to FIG. 2, a previously known structure for forming a particular type of REIT known in the industry as an UPREIT is described. Although by itself, an UPREIT is well known and has certain favorable and unfavorable attributes, the present invention can make use of, and improve upon, the basic UPREIT structure 200 so that it can be utilized in various embodiments of the present invention.

An advantage of using an UPREIT structure 200 is that transfers of property to Operating Partnership 104 in exchange for DCX Units 114 in Operating Partnership 104 may be tax deferred pursuant to IRC Section 721, and Unit Holders 202 are not liable for any debts, liabilities, contracts or obligations of Operating Partnership 104 in excess of their capital contributions to Operating Partnership 104. In an exemplary embodiment, Unit Holders 202 are given the opportunity to redeem DCX Units 114 for shares in REIT 201, although such a redemption could possibly bring an end to the tax deferral enjoyed by Unit Holders 202.

The present invention includes transaction structures that provide Investors 101 that own real property, either directly (i.e., as an individual) or indirectly through a limited liability company, a partnership, a corporation, or a trust, with the opportunity to receive DCX Units 114 in exchange for their direct interests (i.e., ownership of the property itself) or indirect interests (i.e., partnership interests in a partnership owning property) in such real property on a tax-deferred basis, and thereby achieve substantially the same diversification benefits and receive returns that are substantially equivalent to returns on the common stock of REIT 201. Transaction structures of the present invention involve, in no particular order, (i) an exchange of Relinquished Property by its direct owner for Replacement Property in a transaction that falls under the requirements of IRC Section 1031, and (ii) the potential contribution of direct or indirect interests in the Replacement Property or in an Investor Partnership to the Operating Partnership in exchange for DCX Units 114 pursuant to the requirements of IRC Section 721.

A basic UPREIT structure 200 can include an Operating Partnership 104 that invests in real estate properties, such as, for example, commercial real estate properties consisting of high-quality properties that are net leased to creditworthy tenants for varying lease terms. In an exemplary embodiment, Operating Partnership 104 can acquire direct and indirect interests in any other types of real estate asset such as, by way of non-limiting example, shares in various REITs, units in Operating Partnerships in various REITs, mortgages, and other assets that may be legally held by an Operating Partnership under the UPREIT structure.

Operating Partnership 104 can include a plurality of Unit Holders 202, each of which hold at least one operating DCX Unit 114 in Operating Partnership 104. Typically, the Unit Holders 202 are limited partners in the Operating Partnership 104, which owns and maintains a diversified pool of assets consisting primarily of institutional quality real property.

UPREIT structure 200 also includes a REIT 201 that is a general partner in Operating Partnership 104. Generally, the REIT 201 operates in a manner that allows the REIT 201 to qualify as a REIT for Federal income tax purposes. For example, currently to qualify as a REIT for Federal tax purposes, REIT 201 pays dividends to its shareholders of at least 90% of its taxable income for each year. Other requirements to qualify as a REIT and the benefits that accrue as a result of such qualification will be apparent to those of ordinary skill in the art. In an exemplary embodiment, in addition to operating in a manner that allows REIT 201 to qualify as a REIT for Federal income tax purposes, REIT 201 elects REIT status according to well-known procedures and methods. Furthermore, REIT 201 may be listed on a public stock exchange or may be publicly offered and public reporting but not publicly traded, or just not publicly traded.

As discussed above, the present invention features a comprehensive distribution network which efficiently identifies a broad pool of investors (i.e., Exchangers). In one embodiment, the distribution process can include, but are not limited to, the following steps, in no particular order: (a) forming a broker-dealer, (b) producing a private placement memorandum, (c) obtaining selling agreements with "participating dealers," (d) identifying prospective Exchangers, (e) forming a staff (including internal and external employees) to handle marketing and answer customer and prospective customer questions, (f) educating Exchangers (prospective and enrolled) with the private placement memorandum, (g) forming a closing department for facilitating and consummating transaction, and (h) creating an interface between the distribution network and the Operating Partnership's asset management group to create and maintain a database of potential Exchangers and potentially available Replacement Properties.

Methods

Figure 3:
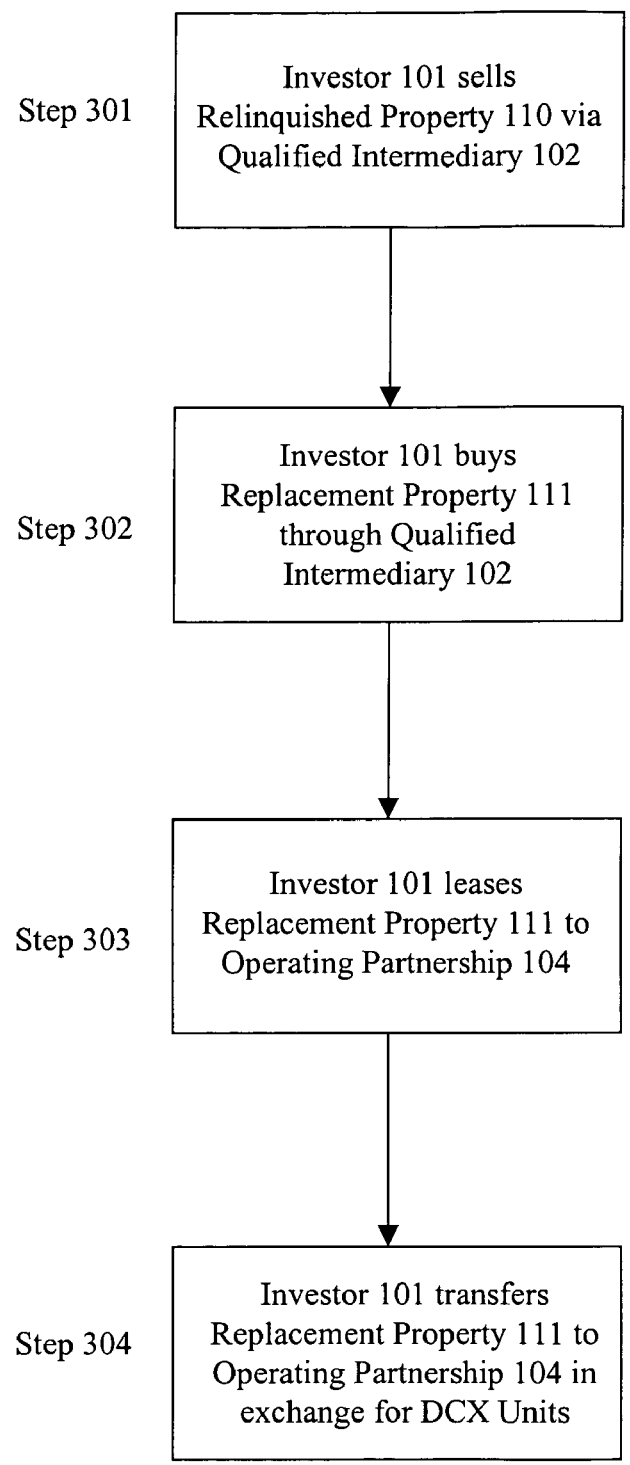
FIG. 3 is a flowchart illustrating the method by which an Individual Investor performs a tax-deferred exchange according to an exemplary embodiment of the present invention.

Referring now to FIG. 3, a flowchart illustrates an exemplary method by which an Investor 101 that is an Individual Investor can perform a tax-deferred exchange and receive a degree of safety through diversification, stability of income, liquidity, divisibility, transparency of investment, as well as various other benefits including limited liability, according to some embodiments of the present invention.

Initially, at Step 301 Investor 101 sells a Relinquished Property 110 via a Qualified Intermediary 102. The Relinquished Property 110 can be sold by entering into a sale agreement for the sale of a Relinquished Property 110 to a Relinquished Property Buyer 103. Investor 101 also enters into a Qualified Intermediary exchange agreement with a Qualified Intermediary 102 and assigns its rights under the sale agreement to Qualified Intermediary 102. Qualified Intermediary 102 facilitates the transfer of the Relinquished Property 110 from Investor 101 to Relinquished Property Buyer 103, and Relinquished Property Buyer 103 deposits all of the proceeds from the sale of the Relinquished Property 110 into an exchange account held by Qualified Intermediary 102.

If the Relinquished Property 110 is subject to any liabilities (e.g., a mortgage), Relinquished Property Buyer 103 may acquire the Relinquished Property 110 subject to the liabilities. In other embodiments, liabilities encumbering the Relinquished Property 110 may be discharged using the proceeds from the sale of the Relinquished Property 110.

At Step 302, Investor 101 purchases a Replacement Property 111, which has been identified and may be underwritten by Operating Partnership 104, through Qualified Intermediary 102. The Replacement Property 111 can be any real property interests including, for example, fee simple title to a whole property, tenancies in common, condominiums, and leaseholds, and can be purchased by entering into a purchase agreement for the acquisition of the Replacement Property 111 from a Replacement Property Seller 105. In an exemplary embodiment, Replacement Property Seller 105 is a third party. In another exemplary embodiment, Replacement Property Seller 105 can be Operating Partnership 104 and the Replacement Property 111 can be any property or interest therein previously acquired by Operating Partnership 104.

For example, Operating Partnership 104 may acquire, by way of non-limiting example, an industrial property. Subsequently, in such an example, the Replacement Property 111 provided to Investor 101 may be a tenancy-in-common interest in the industrial property such that Investor 101 complies with the requirements of IRC Section 1031. Likewise, Operating Partnership 104 may acquire and/or form any other interest in real estate (such as a condominium interest or leasehold interest) that may subsequently be suitable for use as a Replacement Property 111 in a 1031 Exchange with Investor 101.

The Qualified Intermediary 102 can use the sale proceeds 112 from the sale of the Relinquished Property 110 to acquire the Replacement Property 111. The Qualified Intermediary 102 transfers the sale proceeds 112 to the Replacement Property Seller 105 in exchange for the Replacement Property 111, and then transfers the Replacement Property 111 to Investor 101.

At Step 303, Investor 101 leases the Replacement Property 111 to Operating Partnership 104. In an exemplary embodiment, the lease of the Replacement Property 111 to Operating Partnership 104 can include basic terms, such as:

1. The term of the lease will generally be 5-15 years, but in no event will the term be more than 80 percent of the appraised economic useful life of the Replacement Property 111, which will be at least one year at the termination of the lease, and the estimated fair market value of the Replacement Property 111 at the termination of the lease will not be less than 20 percent of the Replacement Property's 111 original cost. (The appraised economic useful life and the estimated fair market value of the Replacement Property 111 are determined as of the date of the commencement of the lease by an independent third-party appraiser.)

2. Operating Partnership 104 has the right ("Call Option"), but not the obligation, to acquire the Replacement Property 111 from Investor 101 for a fixed purchase price equal to or greater than the estimated projected fair market value of the Replacement Property 111 at the time the Call Option becomes exercisable. In an exemplary embodiment, the Call Option is exercisable prior to the end of the eighteenth month following commencement of the lease, but generally, in no event before the Investor 101 has owned the Replacement Property 111 for at least one year ("Call Period"). The exercise price of the Call Option is payable in DCX Units 114. In an exemplary embodiment, the DCX Units 114 are valued at the time of exercise by reference to the fair market value per share of the common stock of REIT 201 into which such DCX Units 114 are redeemable (as described below).

3. Investor 101 may have the right ("Termination Right"), but not the obligation, to terminate the lease in the event that Operating Partnership 104 does not exercise the Call Option. In an exemplary embodiment, the Termination Right is exercisable during the thirty-day period following the expiration of the Call Period.

4. The rents payable over the term of the lease are based on a market rate of rent for comparable property, as determined by an independent third-party appraiser.

Finally, in Step 304, if and when Operating Partnership 104 exercises the Call Option, upon the exercise of the Call Option, Investor 101 transfers the Replacement Property 111 (subject to any liabilities securing such property) to Operating Partnership 104 in exchange for DCX Units 114 (valued as described above). In an exemplary embodiment, in the event that the Call Option is exercised, the transfer of the Replacement Property 111 to Operating Partnership 104 in exchange for DCX Units 114 qualifies as a tax-deferred transaction under IRC Section 721. After the Call Option is exercised, Investor 101 holds DCX Units 114 and Operating Partnership 104 holds the Replacement Property 111.

In an exemplary embodiment, after holding the DCX Units 114 for at least one year, Investor 101 may require Operating Partnership 104 to redeem some or all of its DCX Units 114 for common stock of REIT 201 or, at the option of Operating Partnership 104, for cash (that may include any desirable currency or cash equivalent).

In another exemplary embodiment, in the event that the Call Option is not exercised, Investor 101 retains the Replacement Property 111 subject to all the risks of owning Replacement Property 111, and Investor 101 does not receive any DCX Units 114. Nevertheless, Investor 101 still has received access to a Replacement Property that: a) is the correct size, b) is available for sale, c) is appropriate for the Exchanger's investment objectives, and d) has leverage available on commercially reasonable terms. Also, Investor 101 enjoys the strong credit associated with having the REIT a lessee.

Figure 4:
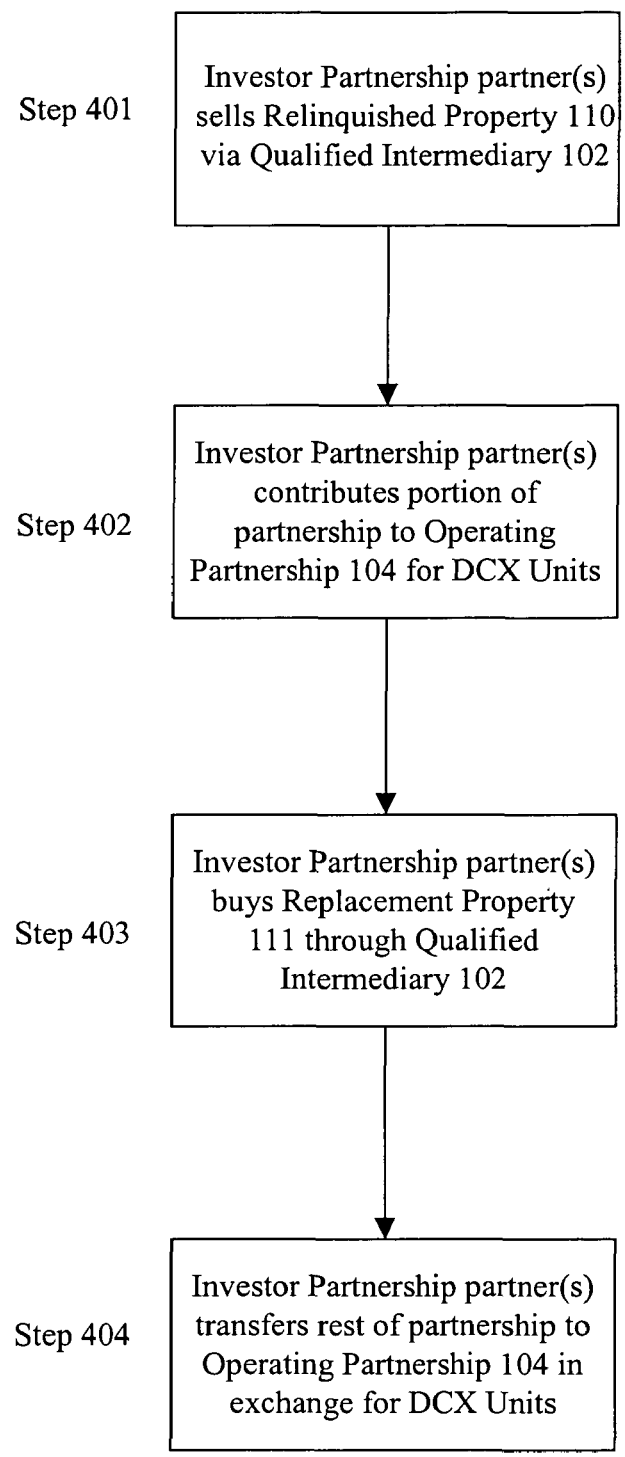
FIG. 4 is a flowchart illustrating the method by which an Investor Partnership performs a tax-deferred exchange according to an exemplary embodiment of the present invention.

Referring now to FIG. 4, there is a flowchart illustrating the method by which an Investor 101 that is an Investor Partnership can perform a tax-deferred exchange and receive degree of safety through diversification, stability of income, liquidity, divisibility, transparency of investment, as well as various other benefits according to some embodiments of the present invention. Initially, in Step 401, Investor 101 enters into a sale agreement for the sale of the Relinquished Property 110 to a Relinquished Property Buyer 103. Investor 101 also enters into an agreement with a Qualified Intermediary 102 and assigns its rights under the sale agreement to Qualified Intermediary 102. Qualified Intermediary 102 facilitates the transfer of the Relinquished Property 110 by Investor 101 to Relinquished Property Buyer 103, and Relinquished Property Buyer 103 deposits all of the net proceeds from the sale of the Relinquished Property into an exchange account held by Qualified Intermediary 102.

Next, in Step 402, one or more partners of Investor Partnership that make up Investor 101 contribute to Operating Partnership 104 control over the Investment Partnership and a portion of their partnership interests in the Investor Partnership representing an aggregate maximum of 49.9% of the total capital interests and an aggregate maximum of 90% of the total profits interests in Investor 101 in exchange for DCX Units 114 of equivalent value. In some exemplary embodiments, the initial contributions may be a pro rata contribution from each of the Investor Partnership partners, provided that no Investor Partnership partner who retains an interest in Investor 101 may make an initial contribution that would cause such Investor Partnership partner's retained profits interest to be less than 10% of the Investor Partnership partner's retained percentage interest in the capital of the Investor 101.

Figure 5:
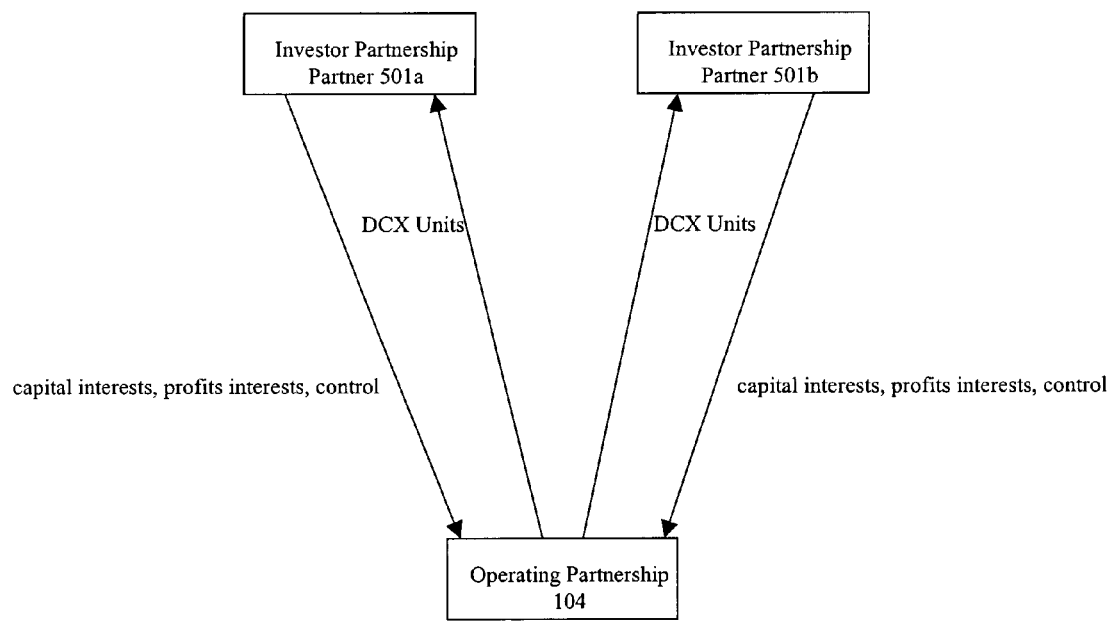
FIG. 5 is a block diagram illustrating step 402 performed in the tax-deferred exchange method of FIG. 4.

For example, referring now to FIG. 5, if Investor Partnership Partner 501a owns a 10% capital and profits interest in an Investor Partnership acting as Investor 101, and makes an initial contribution of 90% of Partner 501a's profits interest and 49.9% of 501a's capital interest to Operating Partnership 104, the 1% retained profits interest that Partner 501a has in the Investor Partnership represents 20.0% (i.e., 1%/5.01%=20.0%) of the capital interest that Partner 501a has in the Investor Partnership, which is in excess of the 10% described above. After the initial contribution, Operating Partnership 104 is designated as either a general partner or sole managing member of Investor 101. In exemplary embodiments of the present invention, the acquisition of partnership interests in the Investor Partnership in exchange for DCX Units 114 can qualify as a tax-deferred transaction under IRC Section 721.

For example, according to some implementations of the present invention, at the time of the initial contribution, Investor 101 and Operating Partnership 104 enter into an agreement that includes reciprocal call and put options between each Investor Partnership Partner 501a-b and Operating Partnership 104. The call and put options are structured, based on the specific characteristics of the underlying interests in the Investor Partnership, such that there is more than a remote possibility that neither of the options will be exercised.

Under the call option, Operating Partnership 104 has the right to acquire the remaining interests in the Investor 101 of each of Investor Partnership Partners 501a-b. Exemplary embodiments can include a call option that is exercisable at any time during the six-month period beginning 12 months after the initial contribution. Other exemplary embodiments can include a strike price and structuring other terms of the call and put option so that Investor Partnership Partners 501a-b retain at least 20 percent of the aggregate upside and downside in the remaining underlying Investor Partnership interests. In an exemplary embodiment, the strike price for the call and put option is payable in DCX Units 114 valued at the time of exercise by reference to the fair market value per share of the common stock of REIT 201 into which such DCX Units 114 are redeemable. For example, if a call option has a strike price of $500,000, Operating Partnership 104 would deliver to Investor Partnership partners 501a-b DCX Units 114 with a value of $500,000 determined at the time of the exercise of the option by reference to the fair market value per share of the common stock of REIT 201 into which such DCX Units 114 are redeemable.

Under the put option, each of Investor Partnership Partners 501a-b can have the right to require Operating Partnership 104 to purchase their remaining interests in the Investor Partnership acting as Investor 101. In some exemplary embodiments, the put option is exercisable at any time during the six-month period beginning 18 months after the date of the initial contribution in exchange for DCX Units 114.

Next, in Step 403, Investor 101 enters into a purchase agreement for the acquisition of the Replacement Property 111 from a Replacement Property Seller 105. As described above with respect to some embodiments illustrated by FIG. 3, Operating Partnership 104 may be the source of the Replacement Property 111 purchased by Investor 101.

For example, Operating Partnership 104 may acquire, by way of non-limiting example, an industrial property. In the case where an Investor 101 and/or Operating Partnership 104 desires to use the industrial property as a Replacement Property 111, the Operating Partnership 104 can take a leasehold interest in the industrial property, thus allowing Investor 101 to use such property as a Replacement Property 111 in compliance with the requirements of IRC Section 1031. Likewise, Operating Partnership 104 may acquire and/or form any other interest in real estate (such as a condominium interest or tenancy-in-common interest) that may subsequently be suitable for use as a Replacement Property 111 in a tax deferred exchange with Investor 101.

At Step 404, if and when either the call option or the put option is exercised, Investor Partnership partners transfer their remaining interests in the Investor Partnership to Operating Partnership 104 in exchange for DCX Units 114 (valued as described above). Accordingly, when either a put or call option is exercised, it will result in the Investor Partnership partners holding DCX Units 114 and the Operating Partnership 104 holding all of the interests in Investor Partnership (which in turn owns the Replacement Property). In exemplary embodiments, the acquisition of partnership interests in the Investor Partnership in exchange for DCX Units 114 can qualify as a tax-deferred transaction under IRC Section 721.

After holding DCX Units 114 for at least one year, each Investor Partnership partner may require Operating Partnership 104 to redeem some or all of their DCX Units 114 for common stock of REIT 201 or, at the option of Operating Partnership 104, for cash.

Some embodiments can also include that in the event that neither the call option nor the put option is exercised, Investor Partnership partners (acting as Investor 101) retain their remaining interests in the Investor Partnership subject to all the risks of owning such remaining interests in Investor Partnership, and do not receive any additional DCX Units 114, but continue to experience the benefits associated with their currently held DCX Units 114, such as safety through diversification, a steady income stream, divisibility, ready liquidity, investment transparency, and relatively low risk return, limited property management, and limited liability. Also, Investor Partnership still has received access to a Replacement Property that: a) is the correct size, b) is available for sale, c) is appropriate for the Exchanger's investment objectives, and d) has leverage available on commercially reasonable terms.

The methods described and the order in which they are presented above are meant to be exemplary and non-limiting. Their order may be changed in order to meet a given situation or to create more advantageous tax benefits according to the needs of particular investors.

Systems

Figure 6:
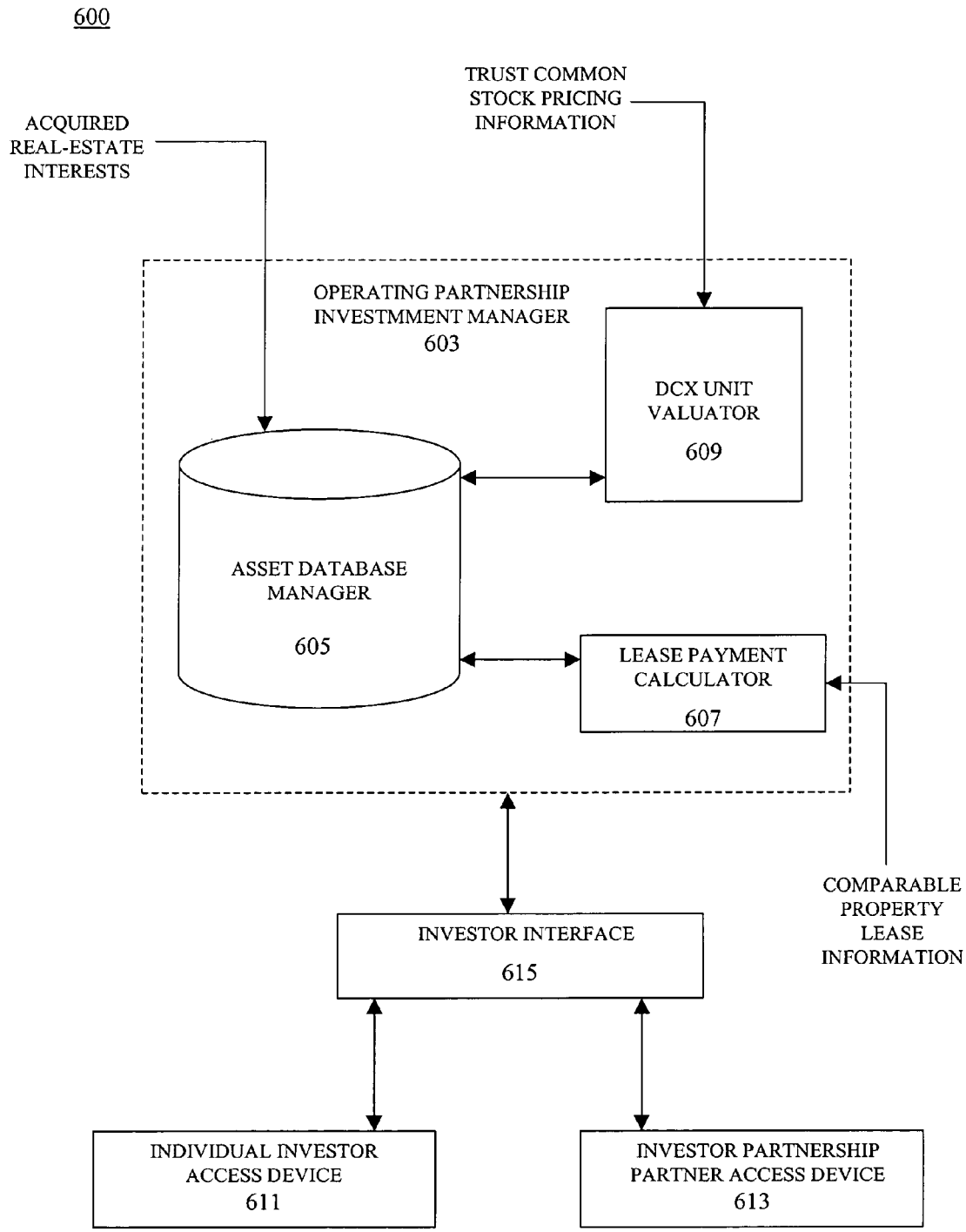
FIG. 6 is a block diagram of a system for implementing the tax-deferred transaction structures of the present invention.

Referring now to FIG. 6, a system 600 is illustrated for implementing some embodiments of the tax-deferred transaction structures of the present invention. System 600 includes an Operating Partnership Investment Manager 603 that keeps track of the assets acquired by Operating Partnership 104 and the interests of all the Investors 101 in Operating Partnership 104. Accordingly, Investment Manager 603 includes an Asset Database Manager 605 that stores information details regarding the real estate interests owned by, or under contract to purchase in favor of, Operating Partnership 104. These real estate interests include, by way of non-limiting example, real estate interests generally acquired by Operating Partnership 104, any Replacement Property 111 acquired by Operating Partnership 104 according to the methods described above, and any real estate assets and interests therein, such as, by way of non-limiting example, a tenancy-in-common, condominium, or leasehold, owned by, or under contract with, any affiliate including, but not limited to, a taxable REIT subsidiary. In an exemplary embodiment, Asset Database Manager 605 stores information pertaining to other types of real estate assets owned such as, by way of non-limiting example, shares in various REITs, units in Operating Partnerships in various REITs and mortgages. As such, system 600 provides Investors 101 with a significant basket of available Replacement Properties 111.

Asset Database Manager 605 further contains records of all Unit Holders 202 and previous and potential Exchangers who might be interested in exchanging property for DCX Units 114, thus providing a readily and efficiently available source of capital. As discussed above, System 600 is part of a larger distribution network of broker-dealers, Qualified Intermediaries, and other such transaction participants and facilitators, which serves to educate prospective Investors 101 regarding the availability of Like Kind Property interests, and facilitate closings.

System 600 also includes a Lease Payment Calculator 607 that receives comparable property lease information and calculates lease payments to be paid to Individual Investors 101 that lease Replacement Property 111 to Operating Partnership 104. Also included in System 600 is an DCX Unit Valuator 609 that receives common stock pricing information for REIT 201, and calculates the value of DCX Units 114 in Operating Partnership 104 that may be used to pay for the purchasing of Replacement Property 111 and/or Investor Partnership interests according to the methods described above.

Investor 101 and Investor Partnership Partners 501a-b can operate Access Devices 611 and 613, respectively, for accessing Investment Manager 603 via Investor Interface 615. Investor 101 and Investor Partnership Partners 501a-b may access Investment Manager 603 to request a Replacement Property 111 that may be used to facilitate a tax-deferred exchange. Upon receiving such a request, a suitable real estate interest may be identified by Asset Database Manager 605 from among the real estate assets owned by Operating Partnership 104 and stored by Asset Database Manager 605.

In some exemplary embodiments, Asset Database Manager 605 also maintains a list of real estate assets not owned by Operating Partnership 104 but that may otherwise be used by Investor 101 and/or Investor Partnership Partners 501a-b to perform a tax-deferred exchange according to the methods described above. In such embodiments, in response to a request for a Replacement Property 111, Asset Database Manager 605 identifies a most suitable property or properties from among the assets owned by Operating Partnership 104 and the assets stored by Asset Database Manager 605 but not owned by Operating Partnership 104.

Also, Investor 101 and Investor Partnership Partners 501a-b can access Investment Manager 603 to request DCX Units 114 valuation information which is calculated by DCX Unit Valuator 609. In an exemplary embodiment, Investment Manager 603 can provide Investor 101 and Investor Partnership Partners 501a-b with regular reports that include the number of DCX Units 114 held, the current value of DCX Units 114 and any other desirable information.

Additionally, Investor 101 can access Investment Manager 603 to receive lease payment information pertaining to Replacement Property 111 that is leased to Operating Partnership 104. Such lease payment information is calculated by Lease Payment Calculator 607. In an exemplary embodiment, Investment Manager 603 can provide Investor 101 with regular reports that include a description of the leased property, lease payments made and any other desirable information. Alternative embodiments can include a calculator which determines put and/or call prices as well.

Accordingly, methods and systems are provided for facilitating a tax-deferred exchange of real estate under IRC Section 1031 and/or IRC Section 721 that result in an Investor receiving an interest in a diversified real estate portfolio, as well as other benefits discussed above. In particular, the Individual Investor exchanges a Relinquished Property for a Replacement Property that may be an industrial property provided by an Operating Partnership. In one embodiment, the Investor then leases its interest in the Replacement Property to the Operating Partnership, and eventually may have the opportunity to sell the interest in the Replacement Property to the Operating Partnership for DCX Units. As a result, the Investor becomes a limited partner in the Operating Partnership via the Investor's ownership of DCX Units. The Investor thus receives an ownership interest in the professionally managed and diversified real estate holdings of the Operating Partnership that may include various types of real estate properties, shares in various REITs, units in Operating Partnerships in various REITs, and/or mortgages, as well as any income relating to such ownership interests such as dividend receipts. Furthermore, the DCX Units received by the Investor may be highly liquid and may also be redeemable for shares in a REIT serving as the general partner of the Operating Partnership.

Additionally, partners of an Investor Partnership can transfer interests in the Investor Partnership to an Operating Partnership in a two stage process (as discussed above), in exchange for DCX Units. Pursuant to such a process, the Investor Partnership can sell a Relinquished Property and purchase a Replacement Property under the requirements of IRC Section 1031.

A number of embodiments of the present invention have been described. Nevertheless, it will be understood that various modifications may be made without departing from the spirit and scope of the invention. Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art, and are also within the scope of the invention. In addition, it will be obvious to one of ordinary skill to use a conventional database management system such as, by way of non-limiting example, Sybase, Oracle and DB2, as a platform for implementing the present invention. Also, network access devices can comprise a personal computer executing an operating system such as Microsoft Windows™, Unix™, or Apple Mac OS™, as well as software applications, such as a JAVA program or a web browser. Access devices can also be a terminal device, a palm-type computer, mobile WEB access device or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description and shown in the accompanying figures shall be interpreted as illustrative and not limiting.

It is also to be understood that the following claims are intended to cover all of the generic and specific features of the invention herein described, and all statements of the scope of the invention, which, as a matter of language, might be said to fall there-between.

The invention claimed is:

1. A computer implemented method for performing a tax-deferred transaction involving an investor owning a relinquished property, the computer system executing a program of computer readable instructions for performing the method comprising the steps of:
   an operating partnership identifying and acquiring replacement property, the operating partnership comprising operating partnership units and the acquiring including transferring, in the computer system, the replacement property to the operating partnership;

the investor exchanging, in a computer system, said relinquished property for said replacement property, in accordance with requirements of Section 1031 of the Internal Revenue Code, wherein the exchanging includes said operating partnership leasing said replacement property and said operating partnership underwriting the lease; and the investor receiving, in the computer system, at least one of said operating partnership units in exchange for said replacement property, in accordance with requirements of Section 721 of the Internal Revenue Code.

2. The method of claim 1, wherein the operating partnership owns or controls an interest in the replacement property and the step of exchanging, in a computer system, said relinquished property for a replacement property includes exchanging, in the computer system, said relinquished property for said interest in said replacement property.

3. The method of claim 1, wherein the step of transferring, in the computer system, said replacement property to an operating partnership includes providing to the operating partnership, in the computer system, an option to purchase said replacement property at a predetermined price and during a predetermined range of time or at a predetermined time.

4. The method of claim 1, further comprising the step of:
calculating, in the computer system, lease payments for said replacement property based on comparable property leasing rates.

5. The method of claim 1, wherein said step of leasing is according to lease conditions and said lease conditions include a lease term of no more than eighty-percent of the useful life of the replacement property such that the value of the replacement property at the end of said lease term is not less than twenty-percent of the original cost of the replacement property.

6. The method of claim 1, further comprising an entity comprising one of a trust or corporation, said entity having shares, and said entity being a general partner in said operating partnership, wherein said operating partnership units are valued based on the value of said shares of said entity.

7. The method of claim 1, further comprising an entity comprising one of a trust or corporation, said entity being a general partner in said operating partnership, said method further comprising redeeming, in the computer system, at least some of said exchanged operating partnership units for cash.

8. The method of claim 1, further comprising an entity comprising one of a trust or corporation, said entity having shares, and said entity being a general partner in said operating partnership, said method further comprising redeeming, in the computer system, at least some of said exchanged operating partnership units for said shares in said entity.

9. The method of claim 8, wherein said entity is a real estate investment trust.

10. The method of claim 1, wherein said operating partnership owns a plurality of assets.

11. The method of claim 9, wherein said entity comprises real estate investment trust units, said operating partnership is a first operating partnership owning a plurality of assets, and said plurality of assets includes one or more assets selected from the group including real property, interests in real property, shares in a real estate investment trust other than said entity, units in a real estate investment trust other than said entity, units in mortgages, and units in at least a second operating partnership, wherein said second operating partnership is different from said first operating partnership.

12. The method of claim 3, wherein said predetermined price is a fair market value.

13. A computer implemented method for performing a tax-deferred transaction involving an operating partnership comprising operating partnership units, the computer executing a program of computer readable instructions for performing the method comprising the steps of:

receiving a request for a replacement property from an investor owning a relinquished property;

identifying, through the operation of a computer system, at least one property from among a plurality of properties previously acquired by said operating partnership as the replacement property, in response to said request;

exchanging, in said computer system, said relinquished property for said replacement property, in accordance with the requirements of Section 1031 of the Internal Revenue Code, wherein said exchanging includes entering into an exercisable agreement to transfer said replacement property from said investor to said operating partnership in exchange for said operating partnership units, in accordance with the requirements of Section 721 of the Internal Revenue Code and leasing, in the computer system, said replacement property to said operating partnership, said operating partnership underwriting said lease.

14. The method of claim 13, further comprising an entity comprising one of a trust or corporation, said entity having shares, and said entity being a general partner in said operating partnership, wherein said operating partnership units are valued based on the value of said shares of said entity.

15. The method of claim 13, further comprising an entity comprising one of a trust or corporation, said entity being a general partner in said operating partnership, said method further comprising paying cash to said investor for at least some of said exchanged operating partnership units.

16. The method of claim 13, further comprising an entity comprising one of a trust or corporation, said entity having shares, and said entity being a general partner in said operating partnership, said method further comprising providing said shares in said entity for at least some of said exchanged operating partnership units.

17. The method of claim 13, wherein said entity is a real estate investment trust.

* * * * *